(12) United States Patent
Street

(10) Patent No.: US 6,508,274 B2
(45) Date of Patent: Jan. 21, 2003

(54) FITTING DUST PLUG

(75) Inventor: David Gene Street, Pottstown, PA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/729,386

(22) Filed: Dec. 4, 2000

(65) Prior Publication Data

US 2002/0067039 A1 Jun. 6, 2002

(51) Int. Cl.[7] .............................................. F16L 55/11
(52) U.S. Cl. ........................ 138/89; 138/89.4; 138/90; 285/312; 285/901
(58) Field of Search ............................ 285/901; 138/89, 138/90, 89.1, 89.2, 89.3, 89.4

(56) References Cited

U.S. PATENT DOCUMENTS

| | | | | |
|---|---|---|---|---|
| 3,451,583 A | * | 6/1969 | Lee, II | 220/233 |
| 4,105,135 A | * | 8/1978 | Bradshaw et al. | 220/288 |
| 4,342,337 A | * | 8/1982 | Underwood | 138/96 T |
| 4,706,836 A | * | 11/1987 | Greck | 220/256 |
| 4,872,710 A | | 10/1989 | Konecny et al. | 285/81 |
| 4,948,179 A | | 8/1990 | Kulikowski et al. | 285/316 |
| 5,224,515 A | * | 7/1993 | Foster et al. | 138/89 |
| 5,320,460 A | * | 6/1994 | Murakami et al. | 411/55 |
| 5,479,961 A | * | 1/1996 | DeMarsh et al. | 138/97 |
| 5,538,297 A | | 7/1996 | McNaughton et al. | 285/319 |
| 5,622,211 A | * | 4/1997 | Martin et al. | 138/177 |
| 6,027,143 A | | 2/2000 | Berg et al. | 285/93 |

* cited by examiner

Primary Examiner—Lynne H. Browne
Assistant Examiner—Giovanna M. Collins
(74) Attorney, Agent, or Firm—Nancy T. Krawczyk

(57) ABSTRACT

The present invention is directed towards a dust plug for insertion into a fluid conduit system. The dust plug is comprised of an insertion end, removal means, and a hollow central body located between the insertion end and the removal means. The insertion end of the plug is formed as a solid flat end so that when the plug is inserted into the fluid conduit system, the hollow interior of the plug does not communicate with the interior of the system. Additionally, the removal means is preferably formed as a continuous lip about the end of the hollow central body.

4 Claims, 3 Drawing Sheets

FITTING DUST PLUG

FIELD OF THE INVENTION

The present invention is directed towards a plug for a circular article. More particularly, the present invention is directed towards a dust plug for a fluid conduit system.

BACKGROUND OF THE INVENTION

It is known in the fitting/coupling art to use dust plugs with fluid conduit systems, e.g. hoses, threaded pipes, that have been provided with a coupling. The dust plug is inserted into the end of the system, mating with the coupling, to prevent any loss of material from the system and to prevent the introduction of foreign material into the system. A conventional dust plug for a cam and groove fitting is illustrated in FIG. 5. The plug 100 has a central body 110 with a hollow center 112. One end of the plug 114 has a tapered end 116 to facilitate insertion of the dust plug 100 into the hose. Along the length of the central body 110 is a groove 118 that cooperates with a lever arm of a cam and groove coupling. The other end of the dust plug 100 has a tab 120. The tab 120 has an aperture 122 for inserting a chain. Typically, a chain is inserted into the tab 120 in order to mate the plug 100 with the system so that the plug 100 is not lost when not inserted into a coupling. However, since the tab 120 is the only portion of the plug 100 that is graspable once the plug 100 is inserted into a coupling, operators have tended to use the tab 120 as the removal means for the plug 100, either by directly pulling on the tab 120 or pulling the chain threaded through the tab 120.

The dust plug 100 is inserted into a coupling so that the end 114 is inserted into the fluid conduit system while only the tab removal means 120 extends outside of the coupling and hose end. The hollow center 112 communicates with the interior of the system and any material that may flow through the system. To remove the dust plug 100 from the hose, after releasing the lever arm of the cam and groove fitting, the operator typically pulls any chain mounted through the aperture 122.

However, this dust plug 100 has several design limitations. Because the axial end 114 is a tapered ring of metal, the end 114 of the dust plug may become easily damaged by dropping the dust plug 100. Since the hollow center 112 of the dust plug 100 communicates with the interior of the fluid conduit system and any material within the system, any dirt or any other foreign objects that enter into the hollow center 112 may enter the system and potentially contaminate the material flowing through the system. The shape of the dust plug 100 makes it difficult and time-consuming for an operator to clean out the hollow center 112 of the dust plug 100 each time the dust plug 100 is inserted into a coupling. Also, the configuration of the removal means 120 is susceptible to being damaged and broken off if the dust plug 100 is dropped or if the operator pulls too hard on any chain threaded through the aperture 122. Once the removal means 120 is broken off, removal of the dust plug 100 becomes extremely difficult for the operator.

SUMMARY OF THE INVENTION

The present invention is directed towards a dust plug for insertion into a fitting that overcomes or eliminates the disadvantages of the conventional dust plug. The dust plug is comprised of an insertion end, removal means, and a hollow central body located between the insertion end and the removal means. The plug is characterized by the insertion end being formed as a solid flat end.

Another aspect of the inventive dust plug is that the removal means is formed as a continuous lip about the end of the hollow central body.

In another aspect of the invention, the removal means has a diameter greater than the outer diameter of the hollow central body.

In another aspect of the invention, the plug is further characterized by the plug comprising an intermediate area adjacent the removal means and the hollow central body. The intermediate area may have a diameter less than the outer diameter of the hollow central body. The intermediate area may also be provided with at least one tab formed therein so that a chain may be attached to the plug.

BRIEF DESCRIPTION OF THE DRAWINGS

The invention will now be described by way of example and with reference to the accompanying drawings in which.

DETAILED DESCRIPTION OF THE PREFERRED EMBODIMENTS

Figure 2:
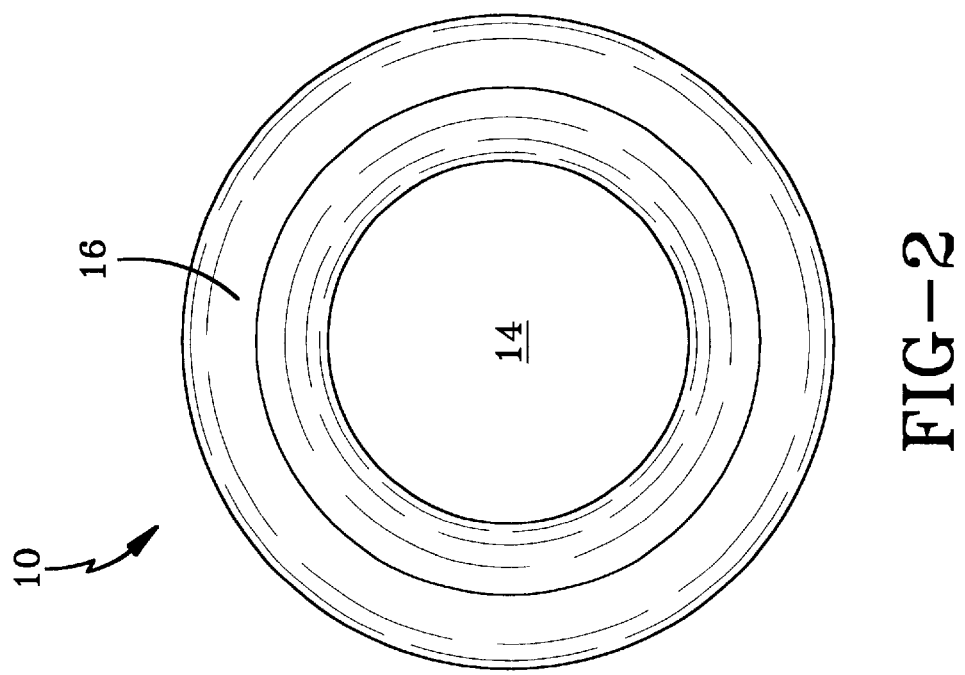
FIG. 2 illustrates the dust plug along line 2—2 of FIG. 1.
Figure 1:
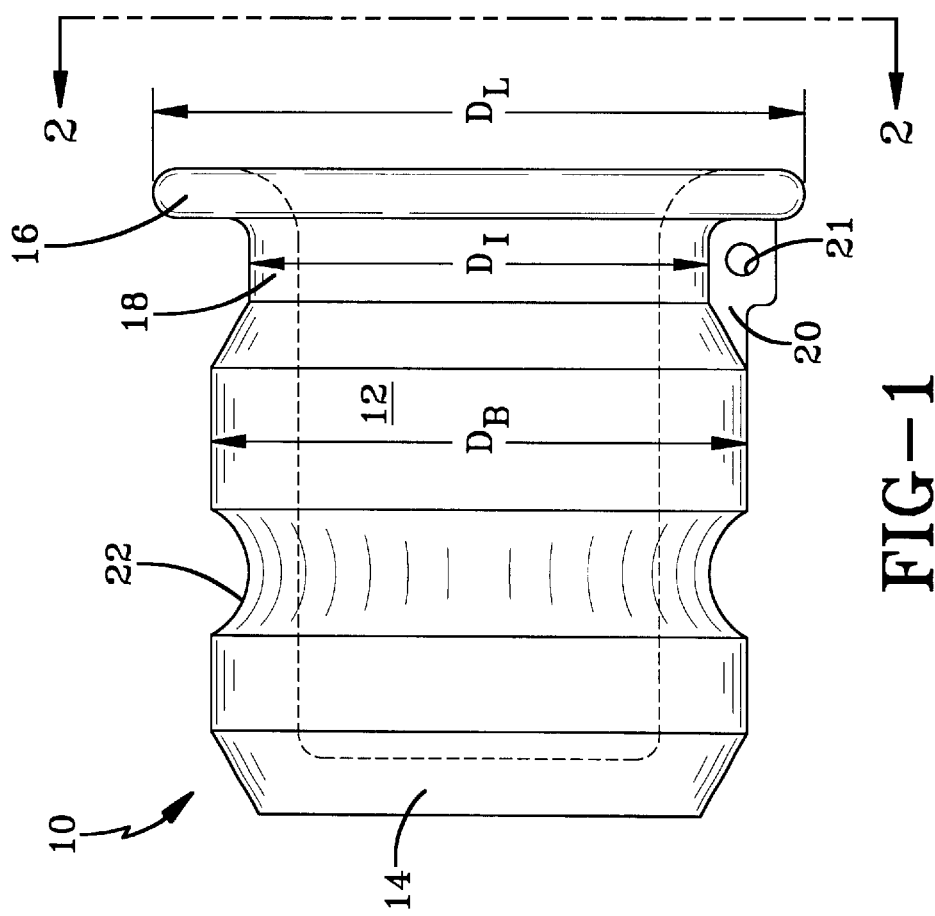
FIG. 1 illustrates a dust plug in accordance with the present invention.

FIGS. 1 and 2 illustrate a dust plug 10 in accordance with the present invention. The illustrated dust plug 10 is for particular use with a cam and groove fitting but may be designed for used with any other type of conventional fitting where dust plugs are used to seal the end of an fluid conduit system. The fluid conduit system may be a flexible hose with a crimped on fitting or a pipe fitted with a threaded coupling, or any other conventional fluid conduit system.

The dust plug 10 has a hollow center body 12. The insertion end 14 of the plug 10 is tapered for easier insertion into a hose end. However, contrary to the conventional dust plug 100, the insertion end 14 of the inventive plug 10 is a closed solid end. When the plug 10 is inserted into a coupling, the hollow body 12 communicates with the space outside of the conduit system rather than with the interior of the system (see FIG. 3).

At the opposing end of the plug 10, the plug 10 has a raised lip 16. In the illustrated preferred embodiment, the lip 16 has a diameter $D_L$ greater than the outer diameter $D_B$ of the hollow body 12. To make the lip 16 more readily graspable, the area 18 adjacent to the lip 16 preferably has a diameter $D_I$ less than the diameter $D_B$ of the hollow body 12. The area 18 adjacent to the lip 16 may also have a constant increasing diameter from the outer diameter $D_B$ of the hollow body 12 to the diameter $D_L$ of the lip; creating a tapered configuration ending in lip 16.

The lip 16 may be formed as a discontinuous lip, so long as there is enough material provided to enable an operator to grasp the end of the plug 10. The lip 16 may also be formed with a diameter $D_L$ less than the outer diameter $D_B$ of the hollow body 12. If the lip 16 if formed with such a lesser diameter, than the area 18 adjacent to the lip 16 must have a configuration that enables the operator to be able to grasp the lip 16 to remove the plug 10 from a coupling.

Similar to the conventional plug 100, the inventive plug 10 is also provided with a means to enable the operator to mate the plug 10 to a coupling by means of a chain. The area 18 adjacent to the lip 16 may have at least one tab 20. The tab 20 has a hole 21 through which a chain may be threaded. Since the tab 20 is integral with the plug 10 along multiple sides of the tab 20, the tab 20 is stronger than the conventional removal means tab 120 and cannot be readily snapped off by tugging on the chain.

Along the length of the hollow body 12 is a groove 22 for cooperation with the lever arm of a cam and groove fitting. The groove 22 is illustrated as continuous about the body 12; however, the body 12 may be provided instead with at least one discrete length groove for cooperation with a lever arm. If the dust plug 10 is to be employed in another type of fitting, i.e., not a cam and groove fitting, than the outer surface of the body 12 may have either a smooth continuous configuration or another configuration which mates with the fitting at the hose end in which the dust plug 10 is to be inserted.

Figure 3:
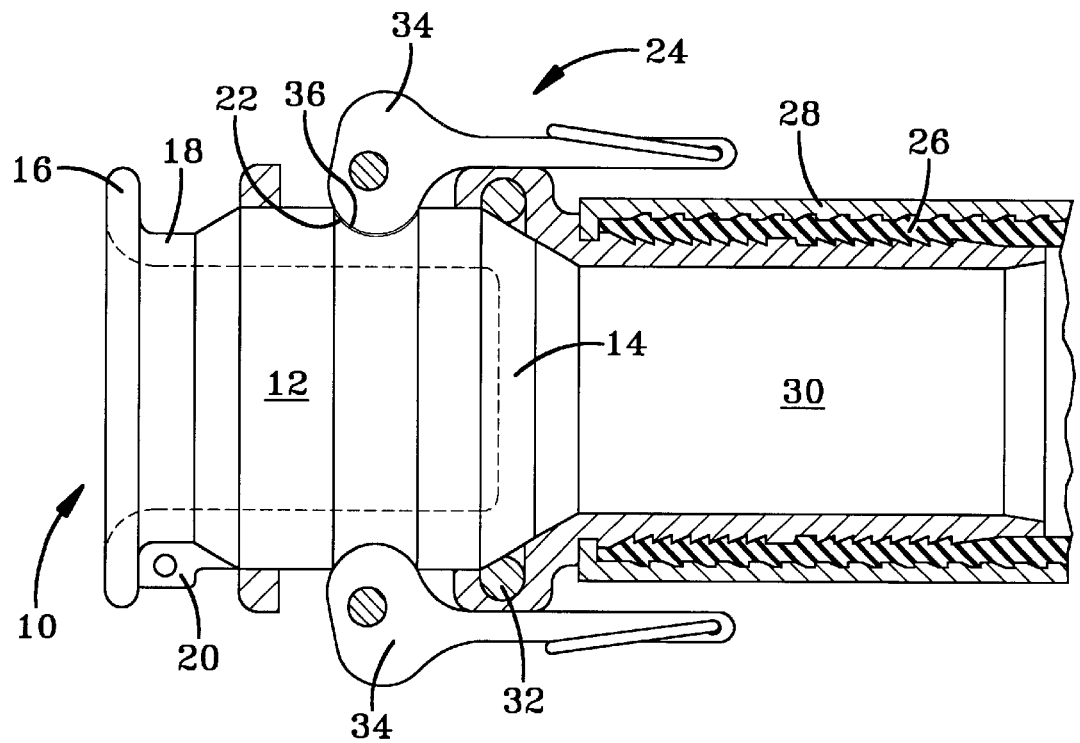
FIG. 3 illustrates the dust plug inserted into a cam and groove fitting crimped onto a hose end.

FIG. 3 illustrates the dust plug 10 after being inserted into a coupling unit 24 of a cam and groove fitting at the end of a hose 26. The coupling unit 24 has been secured onto the hose 26 by means of a crimped-on ferrule 28. The dust plug 10 is inserted into the coupling unit 24 with the insertion end 14 of the plug 10 sealing off the interior 30 of the hose 26. The insertion end 14 abuts against an o-ring 32, or other sealing means provided within the coupling 24. The lever arms 34 are closed and parallel to the body of the coupling unit 24 so that the arcuate portion 36 of the lever arm 34 cooperates with the groove 22 of the plug 10. Movement of the lever arm 34 from a perpendicular position relative to the coupling 24 to the illustrated parallel position pulls the plug 10 further into the coupling unit 24, pushing the insertion end 14 against the o-ring 32.

Removal of the plug 10 is achieved by returning the arms 34 to a perpendicular position relative to the coupling unit 24 and then grasping the lip 16 to pull the plug 10 out of the coupling 24.

Figure 4:
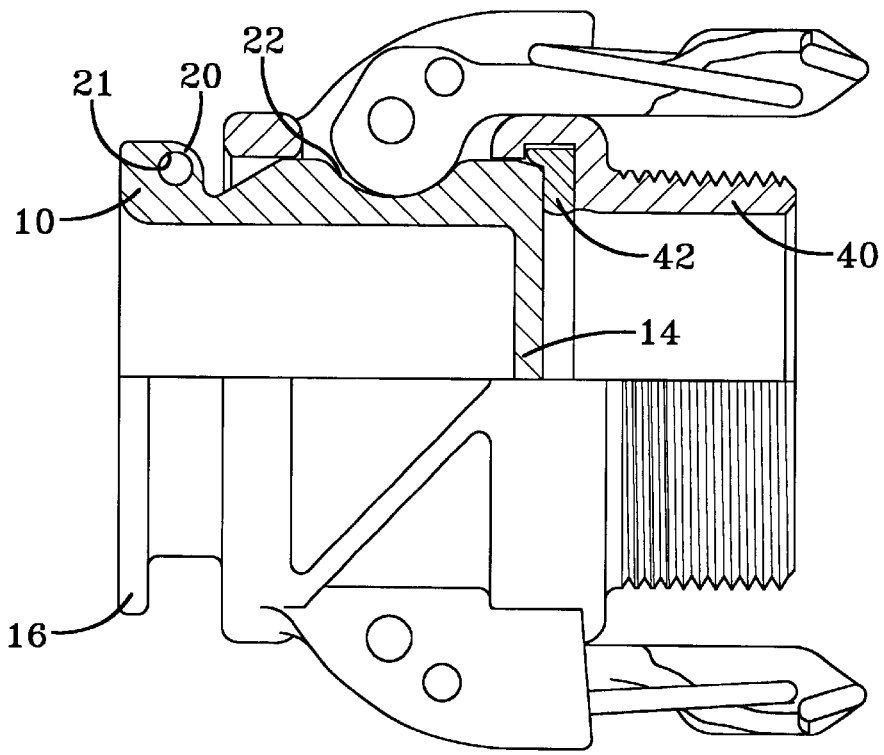
FIG. 4 illustrates the dust plug inserted into a cam and groove fitting for a threaded pipe assembly.
Figure 5:
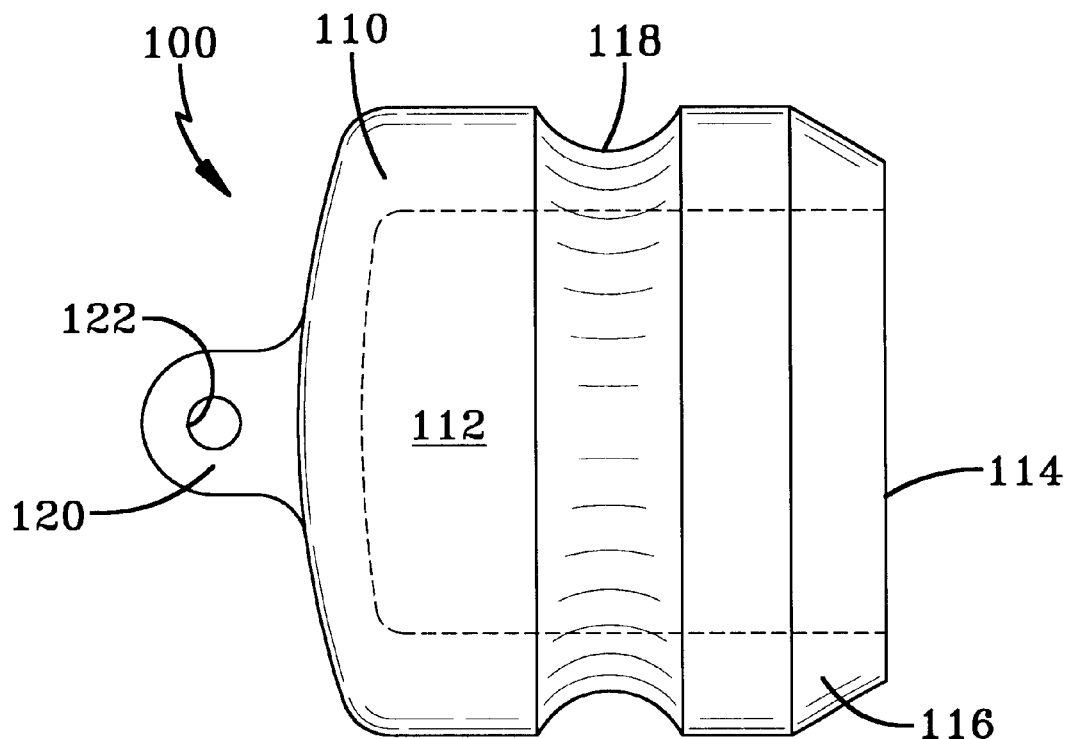
FIG. 5 illustrates a conventional prior art dust plug.

FIG. 4 illustrates the dust plug 10 after being inserted into a threaded cam and groove fitting 40. Such a fitting 40 is threaded onto the end of a pipe or other threaded fluid conduit system. The plug 10 is inserted into the fitting 40 and abuts against the sealing means 42. Because the plug 10 is compressed against the sealing means 42, any fluid flowing through the fluid conduit system is retained within the system.

The inventive dust plug 10 has several advantages over the conventional dust plug 100. One advantage comes in the area of potential contaminants being introduced into the fluid conduit system. Since the insertion end 14 of the plug 10 is a flat solid surface, instead the opening of a hollow interior, any dirt that may collect in the hollow interior of the dust plug 10 is not transferred into the fluid conduit system. If any part of the insertion end 14 of the plug 10 does become dirty, it is easily cleaned by wiping the surface prior to inserting the plug 10 into a coupling 24, 40.

Another advantage of the plug 10 is achieved in the area of durability. Since the insertion end 14 is a solid plate of material, the insertion end 14 it is less susceptible to damage than the conventional ring-like plug end 114. Also, in the preferred embodiment where the lip 16 has a diameter $D_L$ greater than the outer diameter $D_B$ of the body 12, if the plug is dropped, the lip 16 will be struck first, minimizing or reducing any damage to the body 12.

A further advantage is achieved in the area of ease of removal of the plug 10. After the conventional dust plug 100 is inserted into a coupling unit 24, 40, the only portion of the plug 100 that is accessible for the operator to grasp to remove the plug 100 is the tab removal means 120. If this is broken or damaged, it is difficult to remove the plug 100. In all of the various disclosed embodiments of the inventive plug 10, both the lip 16 and the area 18 adjacent the lip 16 extend past the end of the coupling 24, 40, providing the operator ample material to grab onto and remove the plug 10 from the coupling unit 24, 40.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A fluid conduit coupling unit comprising a fitting comprised of an opening and an internal sealing means to be attached to a fluid conduit means and a dust plug, wherein the dust plug is comprised of an insertion end, removal means, and a hollow central body located between the insertion end and the removal means, the plug being characterized by:

the insertion end being formed as a solid flat end, and when the plug is inserted into the fitting, the insertion end of the plug compresses the fitting internal sealing means.

2. A fluid conduit coupling unit in accordance with claim 1 wherein the plug is further characterized by the removal means being formed as a lip about the end of the hollow central body.

3. A fluid conduit coupling unit in accordance with claim 1 wherein the plug is further characterized by the removal means having a diameter greater than the outer diameter of the hollow central body.

4. A fluid conduit coupling unit in accordance with claim 1 wherein the plug is further characterized by the plug comprising an intermediate area adjacent the removal means and the hollow central body, the intermediate area having a diameter less than the outer diameter of the hollow central body.

* * * * *